V. MARTINEZ.
SAFETY LOCK NUT.
APPLICATION FILED FEB. 5, 1916.
1,207,313.
Patented Dec. 5, 1916.
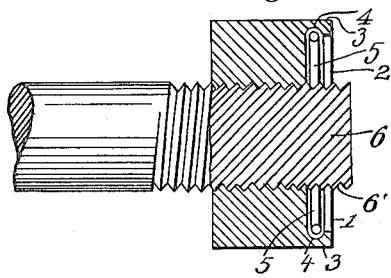
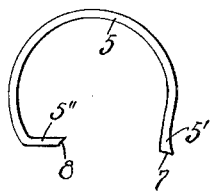
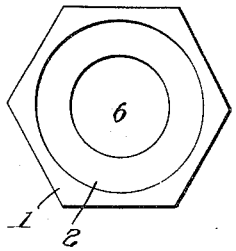
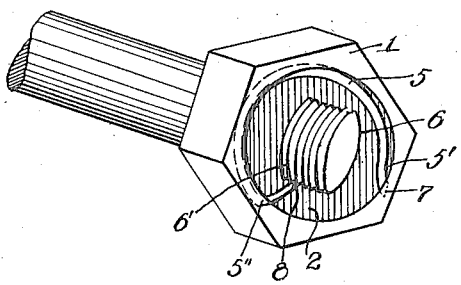
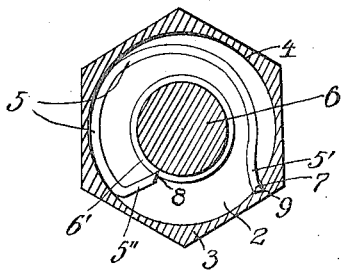
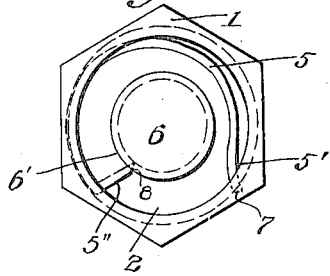
WITNESSES:
INVENTOR.
Victorino Martinez
BY B. Singer
ATTORNEY.

UNITED STATES PATENT OFFICE.

VICTORINO MARTINEZ, OF HABANA, CUBA.

SAFETY LOCK-NUT.

1,207,313.  Specification of Letters Patent.  Patented Dec. 5, 1916.

Application filed February 5, 1916. Serial No. 76,386.

*To all whom it may concern:*

Be it known that I, VICTORINO MARTINEZ, a citizen of the Republic of Cuba, and a resident of Habana, Cuba, have invented certain new and useful Improvements in Safety Lock-Nuts, of which the following is a specification.

The invention relates to nuts and more particularly to nut locks, whereby a nut is securely held in place on a bolt.

It is an object of the invention to provide a locking device which will effectually prevent reverse rotation of the nut even when the parts connected by the bolt vibrate or when the nut itself is in motion.

A further object of the invention aims at the provision of a locking device which is distinguished by resiliency and which may be easily removed preparatory to removing the nut.

With these and other objects in view the preferred embodiment of the invention consists of the novel arrangement and construction of parts described in the following specification.

In the accompanying drawing Figure 1 is a perspective view of a screw provided with a safety lock-nut, constructed in accordance with this invention. Fig. 2 is a front view of same. Fig. 3 is a transverse cross-section of lock-nut and screw. Fig. 4 is a diametral section of same. Fig. 5 is a front view of the lock nut. And Fig. 6 is a detailed view of the spring inner to the lock-nut.

This lock-nut has its outer face 1 provided with a cavity 2 extending nearly all the entire face 1, there being formed in the flange or wall 3 that peripherally borders said cavity an inner channel 4 which partially serves as a seat for a wire-spring 5, which is of curved form, preferably circular, to surround the screw 6, and it has an end 5' slightly bent outwardly and ending in a chisel-shaped pawl 7. The other end forms an elbow 5'' by means of which the spring is bearing against the wall 3, and said elbow ends in a pawl 6 adapted to engage the notch formed between two successive circumvolutions of the helical edge 6' of the screw 6 on which the lock-nut is screwed, so that once the spring 5 being placed in the cavity 2 and partially abutting the annular wall 3 of the lock-nut and surrounding the screw 6, the pawl 7 will enter a groove 9 formed at the bottom of the wall 3, and will be held therein by virtue of the resiliency of spring 5. The spring is thus retained in a fixed position with respect to the lock-nut (Fig. 2), and the pawl 8 of the other end 5'' will engage the notch between two successive threads 6' of the screw. The pawl 8 extends in a direction opposite to that in which the nut is turned, so that the plan of the beveled end of the pawl 8 be in a position nearly perpendicular to the periphery of the screw 6. In this way, when the lock-nut has a tendency to unscrew, the engagement between the pawl 8 and the threaded face of the bolt 6 will be so firm, that it will prevent reverse rotation of the nut.

In order to unscrew the lock-nut it is only necessary to dislodge the spring from the cavity 2 by pressing it inwardly against its elastic tension effected by means of any proper tool, and then withdrawing it from said cavity. To insert the spring 5 it is placed inside of the cavity 2 to surround the screw 6, whereupon the pawl 7 enters the groove 9 and the pawl 8 engages the notch of a threaded part 6' the lock-nut can be tightened on the screw, in which case the pawl 7 remains in the groove 9 while the pawl 8 slides along the notch of the helix 6' of the screw.

It is obvious that the cavity of the lock-nut may have different forms, and in the same way the longitudinal form of the spring can vary, without departing from the spirit of the invention, which is as pointed out in the claim.

What I claim is:—

A safety lock nut, comprising in combination with the bolt to be locked, a nut and a wire spring, the nut having in one of its end surfaces a circular cavity centrally disposed with respect to the bolt hole of the nut, the wire spring being seated in said cavity and engaging at one end the wall of the cavity while the other end is bent inwardly to engage the thread of the bolt, the wire spring being free of engagement with the wall of the cavity between the end of the spring engaging the wall of the cavity and that point of the spring at which the latter is bent to project a portion of the wire in direction toward the nut, the portion of the spring adjacent the last named end being in engagement with the wall of the cavity.

In testimony whereof I affix my signature in presence of two witnesses.

VICTORINO MARTINEZ.

Witnesses:
　RICARDO MORÉ,
　CARLOS MOGNECAS.